(12) United States Patent
Akatsuka et al.

(10) Patent No.: US 11,783,868 B2
(45) Date of Patent: *Oct. 10, 2023

(54) DISK DEVICE TO COVER A WELDED PART OF A HOUSING WITH A PROTECTIVE MEMBER

(71) Applicants: Kabushiki Kaisha Toshiba, Tokyo (JP); Toshiba Electronic Devices & Storage Corporation, Tokyo (JP)

(72) Inventors: Naoto Akatsuka, Yokohama Kanagawa (JP); Yoshinori Sato, Fujisawa Kanagawa (JP); Hideaki Kamezawa, Kawasaki Kanagawa (JP); Hirofumi Kuribara, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,238

(22) Filed: Sep. 28, 2022

(65) Prior Publication Data

US 2023/0036546 A1 Feb. 2, 2023

Related U.S. Application Data

(62) Division of application No. 17/198,521, filed on Mar. 11, 2021, now Pat. No. 11,488,637.

(30) Foreign Application Priority Data

Sep. 16, 2020 (JP) .................................. 2020-155156

(51) Int. Cl.
*G11B 33/02* (2006.01)
*G11B 33/12* (2006.01)
*G11B 33/14* (2006.01)

(52) U.S. Cl.
CPC .......... *G11B 33/027* (2013.01); *G11B 33/022* (2013.01); *G11B 33/12* (2013.01); *G11B 33/14* (2013.01)

(58) Field of Classification Search
None
See application file for complete search history.

(56) References Cited

U.S. PATENT DOCUMENTS 5,535,092 A 7/1996 Bang
5,600,509 A 2/1997 Kawakami
(Continued)

FOREIGN PATENT DOCUMENTS

JP 2020-091934 A 6/2020
KR 20070021419 A * 2/2007 ........... G11B 25/043
(Continued)

*Primary Examiner* — William J Klimowicz
(74) *Attorney, Agent, or Firm* — Allen & Overy LLP

(57) ABSTRACT

According to one embodiment, a disk device includes a recording medium of a disk form, a magnetic head, a housing, and a first protective member made of a resin. The recording medium includes a recording layer. The magnetic head is configured to read/write information from/to the recording medium. The housing includes a base provided with an inner chamber in which the recording medium and the magnetic head are accommodated, a cover that covers the inner chamber, and a welded part at which the base and the cover are welded to each other. The first protective member is located outside the housing, to cover at least part of the welded part.

7 Claims, 6 Drawing Sheets

(56) References Cited

U.S. PATENT DOCUMENTS

| | | |
|---|---|---|
| 6,515,098 B1 | 2/2003 | Hariharan et al. |
| 6,934,126 B1 | 8/2005 | Berding et al. |
| 7,218,473 B2 | 5/2007 | Bernett et al. |
| 7,471,509 B1 | 12/2008 | Oliver |
| 8,451,559 B1 | 5/2013 | Berding et al. |
| 9,099,163 B1 | 8/2015 | Casey et al. |
| 9,460,756 B1 | 10/2016 | Forbord et al. |
| 9,570,114 B1 | 2/2017 | Sudo et al. |
| 9,601,161 B2 | 3/2017 | McGuire et al. |
| 9,721,620 B2 | 8/2017 | Sudo et al. |
| 9,786,330 B1 | 10/2017 | Usami et al. |
| 10,002,645 B2 | 6/2018 | McGuire |
| 10,134,448 B2 | 11/2018 | Albrecht |
| 10,153,005 B1 | 12/2018 | Ayanoor-Vitikkate et al. |
| 10,399,177 B1 * | 9/2019 | Coffey ................ H05K 5/04 |
| 10,706,893 B1 * | 7/2020 | Erickson ............ G11B 25/043 |
| 10,803,908 B1 | 10/2020 | Tamura et al. |
| 11,488,637 B2 * | 11/2022 | Akatsuka ............ G11B 33/022 |
| 11,514,950 B2 * | 11/2022 | Tee .................... G11B 33/022 |
| 2006/0120031 A1 | 6/2006 | Zayas |
| 2011/0212281 A1 | 9/2011 | Jacoby et al. |
| 2019/0287573 A1 * | 9/2019 | Terasaki ............ G11B 33/022 |
| 2021/0074324 A1 * | 3/2021 | Kato .................. G11B 33/148 |

FOREIGN PATENT DOCUMENTS

| | | | | |
|---|---|---|---|---|
| KR | 20100118904 A | * | 11/2010 | ........... G11B 33/022 |
| WO | WO-2015191479 A1 | * | 12/2015 | ........... G11B 25/043 |

\* cited by examiner

DISK DEVICE TO COVER A WELDED PART OF A HOUSING WITH A PROTECTIVE MEMBER

CROSS-REFERENCE TO RELATED APPLICATIONS

This application is a divisional of U.S. application Ser. No. 17/198,521 filed on Mar. 11, 2011 and is based upon and claims the benefit of priority from Japanese Patent Application No. 2020-155156, filed on Sep. 16, 2020 the entire contents of which are incorporated herein by reference.

FIELD

Embodiments described herein relate generally to a disk device.

BACKGROUND

A disk device, such as a hard disk drive (HDD), includes a magnetic disk and a magnetic head for reading and writing information from and to the magnetic disk. The magnetic disk, the magnetic head, and various components are housed in a housing.

For example, the housing includes a base and a top cover welded to the base. The top cover is, for example, welded to the base to airtightly close the inside of the housing. The housing encloses, for example, a low-density gas, such as helium, inside to reduce the rotational resistance of the magnetic disk and the magnetic head.

The welded part tends to be more vulnerable than the other parts of the housing. Because of this, collision of the welded part with another object, if it occurs, may impair the airtightness of the housing at the welded part.

DETAILED DESCRIPTION

In general, according to one embodiment, a disk device includes a recording medium of a disk form, a magnetic head, a housing, and a first protective member made of a resin. The recording medium includes a recording layer. The magnetic head is configured to read and write information from and to the recording medium. The housing includes a base provided with an inner chamber in which the recording medium and the magnetic head are accommodated, a cover that covers the inner chamber, and a welded part at which the base and the cover are welded to each other. The first protective member is located outside the housing, to cover at least part of the welded part.

First Embodiment

Next, an explanation will be given of a first embodiment with reference to FIGS. 1 to 3. It should be noted that, in the present specification, there is a case where a plurality of expressions are used, with reference to a constituent element according to an embodiment and description on the element. The constituent elements and description thereof are mere examples, and are not limited to the expressions given in the present specification. A constituent element may be identified with a name different from that in the present specification. Further, a constituent element may be described by using an expression different from that in the present specification.

Figure 1:
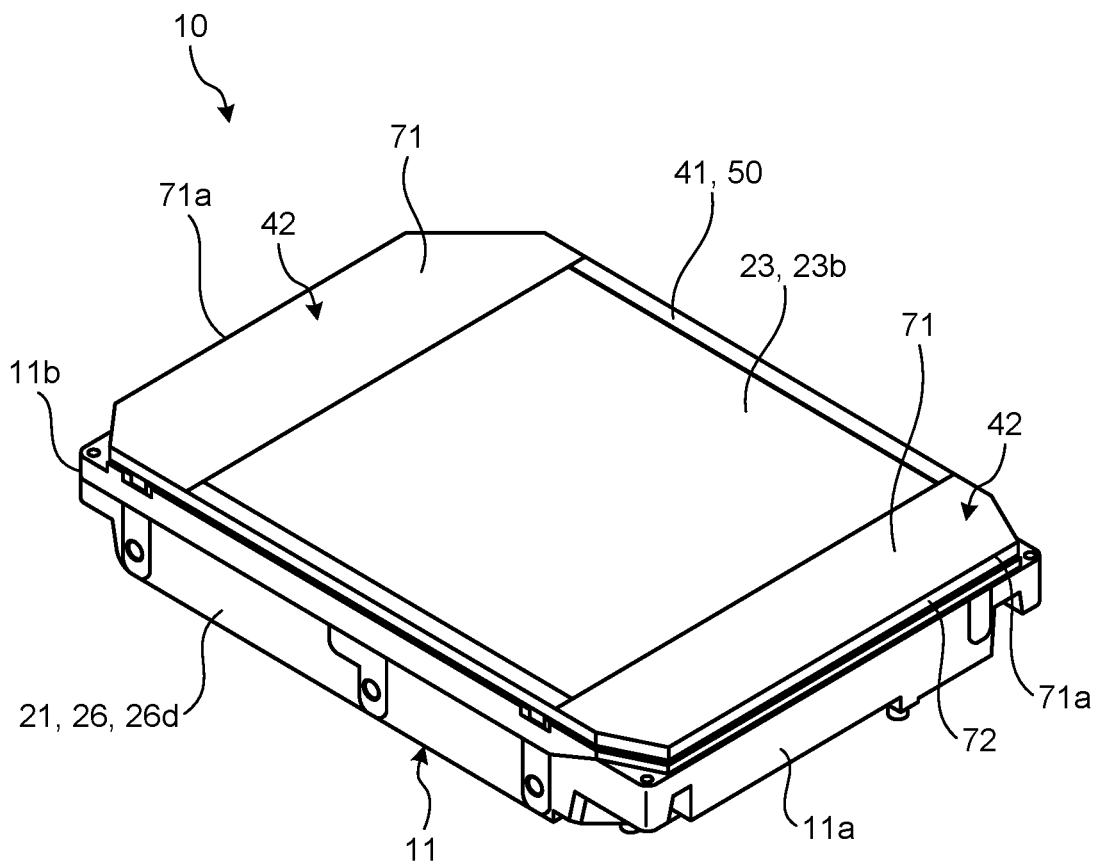
FIG. 1 is an exemplary perspective view illustrating a hard disk drive (HDD) according to a first embodiment.

FIG. 1 is an exemplary perspective view illustrating a hard disk drive (HDD) 10 according to the first embodiment. The HDD 10 is an example of a disk device, and can also be called "electronic device", "storage device", "external storage device", or "magnetic disk device".

In this disclosure, as illustrated in the respective figures, an X-axis, a Y-axis, and a Z-axis are defined for the sake of convenience. The X-axis, the Y-axis, and the Z-axis are orthogonal to one another. The X-axis is along the width of the HDD 10. The Y-axis is along the length of the HDD 10. The Z-axis is along the thickness of the HDD 10.

Further, in this disclosure, an X-direction, a Y-direction, and a Z-direction are defined. The X-direction is a direction along the X-axis and includes a +X-direction indicated by the arrow of the X-axis and a −X-direction opposite to the arrow of the X-axis. The Y-direction is a direction along the Y-axis, and includes a +Y-direction indicated by the arrow of the Y-axis and a −Y-direction opposite to the arrow of the Y-axis. The Z-direction is a direction along the Z-axis, and includes a +Z-direction indicated by the arrow of the Z-axis and a −Z-direction opposite to the arrow of the Z-axis.

Figure 2:
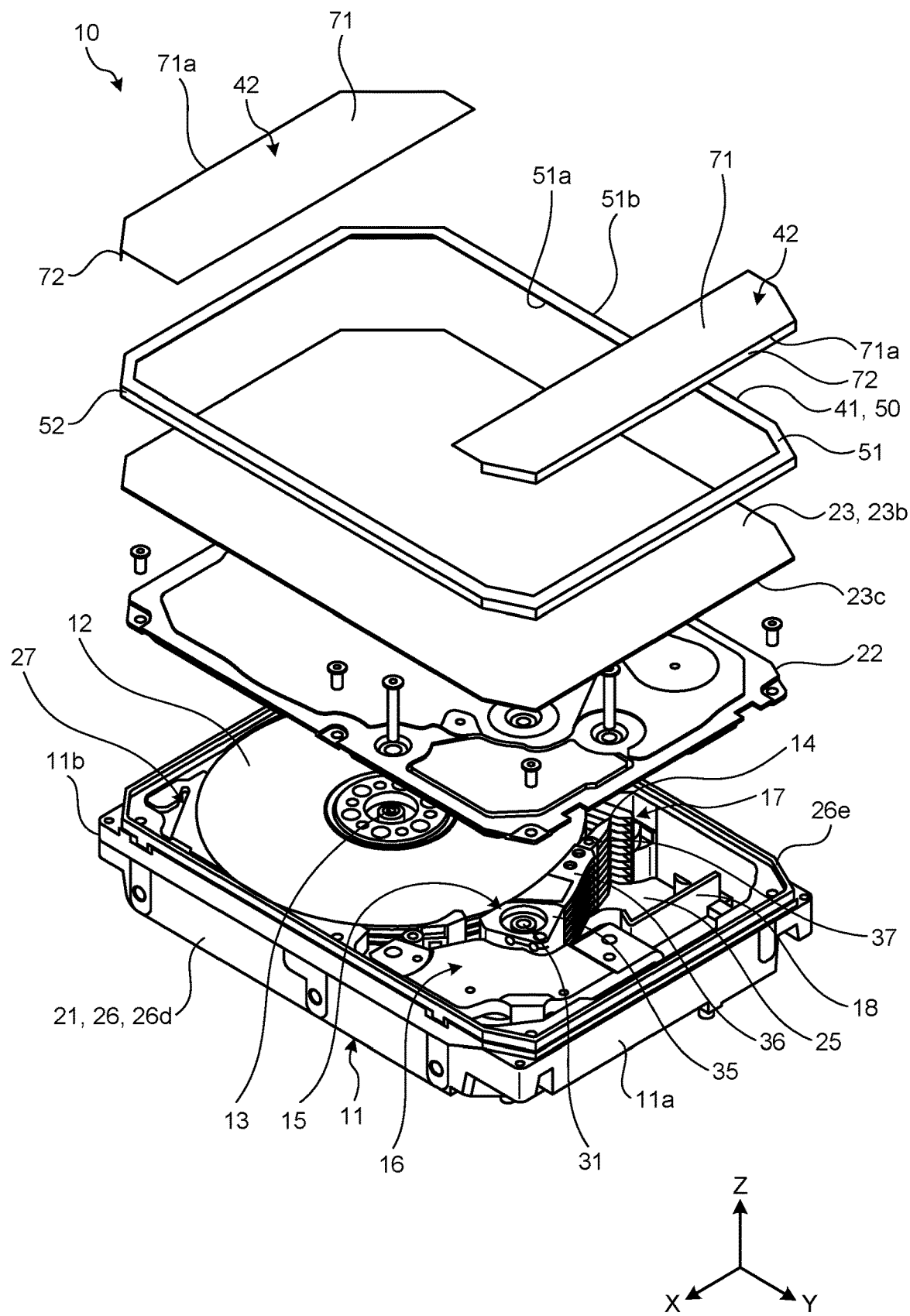
FIG. 2 is an exemplary perspective view illustrating the HDD of the first embodiment in an exploded state.

FIG. 2 is an exemplary exploded perspective view illustrating the HDD 10 of the first embodiment. FIG. 3 is an exemplary sectional view illustrating part of the HDD 10 of the first embodiment. As illustrated in FIG. 2, the HDD 10 includes a housing 11, a plurality of magnetic disks 12, a spindle motor 13, a plurality of magnetic heads 14, an actuator assembly 15, a voice coil motor (VCM) 16, a ramp load mechanism 17, and a flexible printed circuit board (FPC) 18. As illustrated in FIG. 3, the HDD 10 further includes a printed circuit board (PCB) 19. The magnetic disks 12 represent an example of a recording medium.

As illustrated in FIG. 2, the housing 11 has a rectangular parallelepiped box shape extending in the Y-direction. The housing 11 includes a base 21, an inner cover 22, and an outer cover 23. The base 21 is an example of an accommodation member. The outer cover 23 is an example of a lid. The housing 11 is not limited to this example and may include other components.

The base 21 is a bottomed container and includes a bottom wall 25 and a peripheral wall 26. The bottom wall 25 has a substantially rectangular (quadrangular) plate shape extending across the X-Y plane. The peripheral wall 26 projects from the edge of the bottom wall 25 substantially in the +Z-direction, and has a substantially rectangular frame shape. In other words, the peripheral wall 26 projects from the bottom wall 25 in a direction substantially orthogonal to the bottom wall 25. The bottom wall 25 and the peripheral wall 26 are made of a metal material, such as an aluminum alloy, and are united with each other.

Figure 3:
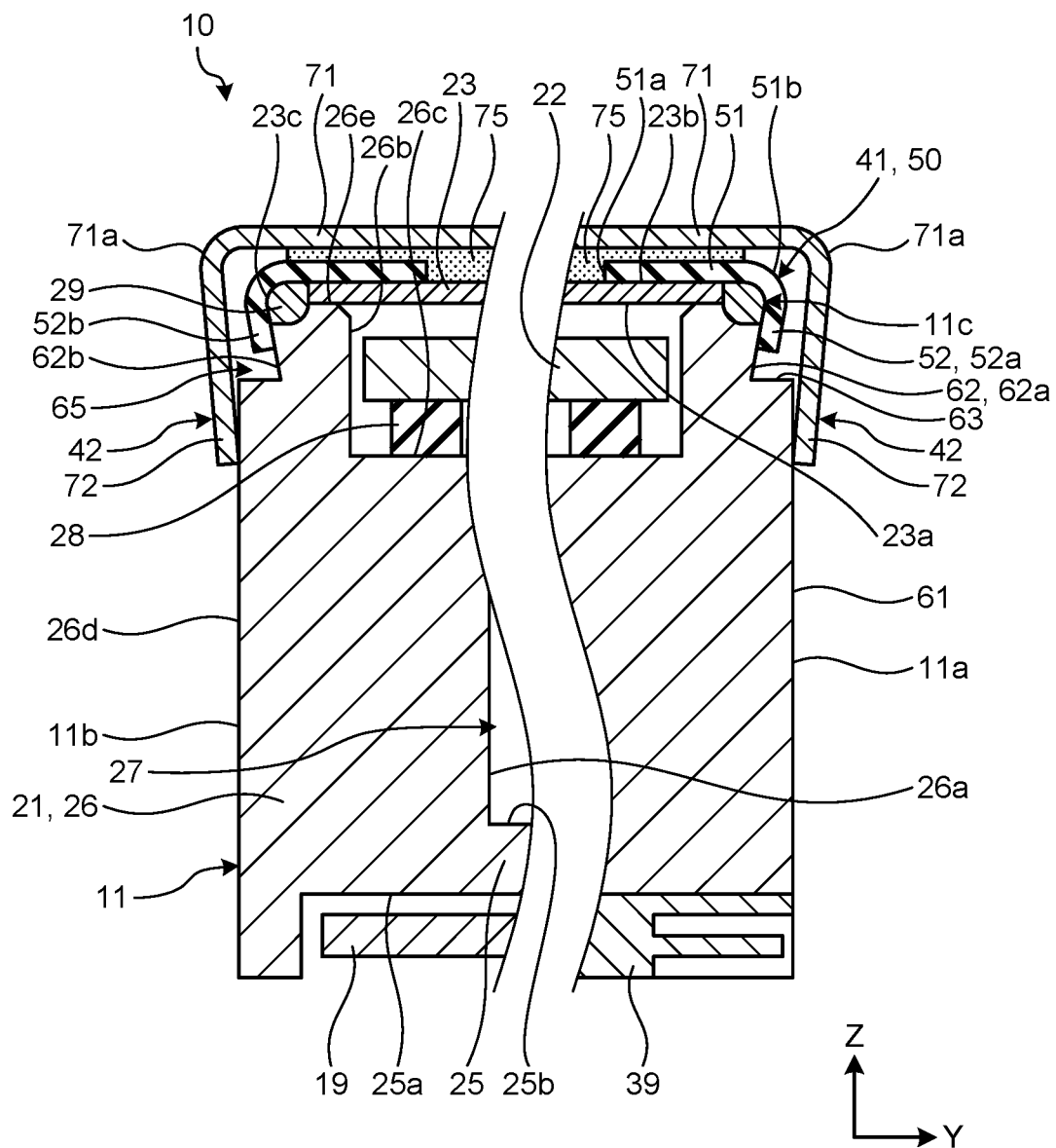
FIG. 3 is an exemplary sectional view illustrating part of the HDD of the first embodiment.

As illustrated in FIG. 3, the bottom wall 25 includes an outer bottom surface 25a and an inner bottom surface 25b. The outer bottom surface 25a faces the outside of the housing 11. The inner bottom surface 25b is opposite to the outer bottom surface 25a, facing the inside of the housing 11. For example, the outer bottom surface 25a faces in the −Z-direction, and the inner bottom surface 25b faces in the +Z-direction. Each of the outer bottom surface 25a and the inner bottom surface 25b may face in another direction.

The peripheral wall 26 includes a first inner surface 26a, a second inner surface 26b, a support surface 26c, an outer surface 26d, and an end surface 26e. The first inner surface 26a and the second inner surface 26b represent an example of an inner surface. The peripheral wall 26 is not limited to this example.

The first inner surface 26a and the second inner surface 26b face the inside of the housing 11. The second inner surface 26b is more distant from the bottom wall 25 than the first inner surface 26a is. The support surface 26c is located between the first inner surface 26a and the second inner surface 26b, and faces substantially in the +Z-direction.

The outer surface 26d is opposite to the first inner surface 26a and the second inner surface 26b, and faces the outside of the housing 11. The end surface 26e is located at the end of the peripheral wall 26 in the +Z-direction. The end surface 26e faces substantially in the +Z-direction. The end surface 26e is not limited to this example.

The base 21 is provided with an inner chamber 27 opening in the +Z-direction. For example, the inner chamber 27 is formed or defined by the inner bottom surface 25b of the bottom wall 25, and the first inner surface 26a, the second inner surface 26b, and the support surface 26c of the peripheral wall 26. That is, the peripheral wall 26 surrounds the inner chamber 27 while the inner bottom surface 25b of the bottom wall 25 and the first inner surface 26a, the second inner surface 26b, and the support surface 26c of the peripheral wall 26 face the inner chamber 27.

The inner cover 22 and the outer cover 23 are made of a metal material, such as an aluminum alloy. In other words, the inner cover 22 and the outer cover 23 are made of the same material as the base 21. The base 21, the inner cover 22, and the outer cover 23 may be made of materials different from one another.

The inner cover 22 has a substantially rectangular (quadrangular) plate shape that extends across the X-Y plane. The inner cover 22 is apart from the bottom wall 25 in the +Z-direction. The inner cover 22 is supported by the support surface 26c of the peripheral wall 26 though a cushioning material 28, for example. The cushioning material 28 is made of a synthetic rubber, gel, or sponge, for example. The inner cover 22 is attached to the base 21 with screws, for example. The inner cover 22 is placed in the inner chamber 27.

The outer cover 23 has a substantially rectangular (quadrangular) plate shape that extends across the X-Y plane. The outer cover 23 is separated from the inner cover 22 in the +Z-direction. The outer cover 23 is supported by the end surface 26e of the peripheral wall 26, and covers the inner chamber 27 opening in the +Z-direction. Thus, the outer cover 23 covers the inner cover 22.

The outer cover 23 includes a first surface 23a, a second surface 23b, and an outer edge 23c. The first surface 23a faces the inner chamber 27 inside the housing 11. Part of the first surface 23a is supported by the end surface 26e of the peripheral wall 26. The second surface 23b is opposite to the first surface 23a, facing the outside of the housing 11. For example, the first surface 23a faces in the −Z-direction, and the second surface 23b faces in the +Z-direction. Each of the first surface 23a and the second surface 23b may face in another direction.

The outer edge 23c extends between the first surface 23a and the second surface 23b. For example, the outer edge 23c extends on the end surface 26e of the peripheral wall 26 or forms a surface substantially coplanar with the outer surface 26d. The outer edge 23c can be united with the base 21 by welding, as described below.

The outer cover 23 is fixed to the end surface 26e of the peripheral wall 26 in an airtight manner by welding, such as laser welding. Thus, the housing 11 further includes a welded part 29. The welded part 29 corresponds to the part of the housing 11 where the end surface 26e of the peripheral wall 26 of the base 21 is welded to the outer cover 23. The base 21 and the outer cover 23 are united together at the welded part 29.

At the welded part 29, the entire outer edge 23c of the outer cover 23 and the end surface 26e of the peripheral wall 26 are welded to each other. The welded part 29 is located on part of the second surface 23b of the outer cover 23, the entire outer edge 23c, and part of the outer surface 26d of the peripheral wall 26. The welded part 29 is exposed to the outside of the housing 11.

The outer cover 23 welded to the base 21 can airtightly close the inner chamber 27. The outer cover 23 may not close the inner chamber 27 completely airtightly. The inner chamber 27 accommodates the magnetic disks 12, the spindle motor 13, the magnetic heads 14, the actuator assembly 15, the VCM 16, the ramp load mechanism 17, and the FPC 18.

The inner chamber 27 is filled with a gas different from air. For example, the inner chamber 27 is filled with a low-density gas lower in density than air, an inactive gas with low reactivity, or the like. In this embodiment, the inner chamber 27 is filled with helium. The inner chamber 27 may be filled with another fluid. Further, the inner chamber 27 may be kept in a vacuum, at a low pressure close to the vacuum, or at a negative pressure lower than the atmospheric pressure.

The helium is injected into the inner chamber 27 through vent holes in the inner cover 22 and the outer cover 23, for example. After various components, and the inner cover 22 and the outer cover 23 are attached to the base 21, air is removed from the inner chamber 27 through the vent holes, and the helium is injected into the inner chamber 27 through the vent holes. The vent holes are airtightly closed by sealing, for example.

Each of the magnetic disks 12 of FIG. 2 includes a magnetic recording layer on the upper face and the lower face, for example. The diameter of each magnetic disk 12 is set to 3.5 inches, for example, but is not limited to this example.

The spindle motor 13 supports and rotates the magnetic disks 12 stacked on each other at intervals. The magnetic disks 12 are held on the hub of the spindle motor 13 with a clamp spring, for example.

The magnetic heads 14 record and reproduce information on and from the respective recording layers of the magnetic disks 12. In other words, the magnetic heads 14 read and write information from and to the magnetic disks 12. The magnetic heads 14 are supported by the actuator assembly 15.

The actuator assembly 15 is rotatably supported by a support shaft 31 placed apart from the magnetic disks 12. The VCM 16 rotates the actuator assembly 15 to place the assembly 15 at a desired position. After the magnetic heads 14 move to the outermost circumference of the magnetic disks 12 by the rotation of the actuator assembly 15 by the VCM 16, the ramp load mechanism 17 holds the magnetic heads 14 at an unload position away from the magnetic disks 12.

The actuator assembly 15 includes an actuator block 35, a plurality of arms 36, and a plurality of head suspension assemblies 37. Each of the head suspension assemblies 37 may also be referred to as "head gimbal assembly (HGA)".

The actuator block 35 is rotatably supported by the support shaft 31 via a bearing, for example. The plurality of arms 36 projects from the actuator block 35 in a direction substantially orthogonal to the support shaft 31. The actuator assembly 15 may be divided such that the arms 36 project from the corresponding actuator blocks 35.

The arms 36 are arranged at intervals in the extending direction of the support shaft 31. Each of the arms 36 has a plate shape that is insertable into the spacing between the adjacent magnetic disks 12. The arms 36 extend substantially in parallel to each other.

The actuator block 35 and the arms 36 are integrally formed from aluminum, for example. The material of the actuator block 35 and the arms 36 is not limited to this example.

The actuator block 35 has a protrusion projecting in the direction opposite to the arms 36, and the voice coil of the VCM 16 is set on the protrusion. The VCM 16 includes a pair of yokes, the voice coil placed between the yokes, and magnets included in the yokes.

As described above, the VCM 16 rotates the actuator assembly 15. In other words, the VCM 16 integrally rotates or moves the actuator block 35, the arms 36, and the head suspension assemblies 37.

The head suspension assemblies 37 are attached to the tips of the corresponding arms 36, and project from the arms 36. Thus, the head suspension assemblies 37 are arranged at intervals in the extending direction of the support shaft 31.

Each of the head suspension assembly 37 includes a displaceable gimbal (elastic support) at the distal end. The magnetic heads 14 are mounted on the gimbals of the corresponding head suspension assemblies 37. Each magnetic head 14 is electrically connected to the FPC 18 through a flexure disposed on the corresponding head suspension assembly 37.

The PCB 19 illustrated in FIG. 3 includes a rigid flexible (such as glass epoxy board), multilayer or buildup circuit board, for example. The PCB 19 is attached to the outer bottom surface 25a of the bottom wall 25 of the base 21 outside the housing 11. The PCB 19 is attached to the bottom wall 25 with a plurality of screws, for example.

The PCB 19 is electrically connected to the FPC 18 placed in the inner chamber 27 through a connector disposed on the bottom wall 25. At the part provided with the connector, the bottom wall 25 airtightly closes the inner chamber 27.

The PCB 19 is equipped with an interface (I/F) connector 39 thereon. The I/F connector 39 is an example of a connector. The I/F connector 39 is a connector that conforms to an interface standard, such as Serial ATA, and is connected to the I/F connector of a host computer.

For example, the I/F connector 39 is connectable directly or indirectly to the host computer through a cable. The host computer is an example of an external apparatus. Through the I/F connector 39, the HDD 10 receives power supply from the host computer, and transmits and receives various data to and from the host computer.

The I/F connector 39 is located at a first end 11a of the housing 11. The first end 11a is the end of the housing 11 in the +Y-direction. For example, the I/F connector 39 is placed in a cutout formed in the base 21 at the first end 11a.

Various electronic components including a controller are mounted on the PCB 19. The controller is, for example, electrically connected to the spindle motor 13, the magnetic heads 14, and the VCM 16 and performs control of the HDD 10 as a whole.

As illustrated in FIG. 2, the HDD 10 further includes a first protective member 41 and two second protective members 42. The first protective member 41 is an example of a first protective member and a protective member. The HDD 10 may include one or three or more second protective member or members 42, or may omit the second protective members 42.

The first protective member 41 includes a cover wall 50. The cover wall 50 of this embodiment is a molded component made of a resin. In other words, the cover wall 50 includes a resin. For example, the cover wall 50 is made of an elastomer, such as a synthetic rubber. The resin may include a synthetic resin such as a plastic and a natural resin such as natural rubber, in addition to the synthetic rubber. Further, the cover wall 50 may be in the form of sponge.

The cover wall 50 is softer than the housing 11 made of an aluminum alloy. For example, the Young's modulus of the cover wall 50 is lower than the Young's modulus of each of the base 21, the outer cover 23, and the welded part 29 of the housing 11. Further, the cover wall 50 may be lower in another physical property related to softness, such as Vicker's hardness, than each of the base 21, the outer cover 23, and the welded part 29.

As illustrated in FIG. 3, the cover wall 50 is located outside the housing 11, covering the welded part 29 entirely. The cover wall 50 may partially expose the welded part 29. That is, the cover wall 50 covers at least part of the welded part 29.

The cover wall 50 tightly attaches to the welded part 29. In other words, the cover wall 50 contacts or is adjacent to substantially the entire surface of the welded part 29 exposed to the outside of the housing 11. There may be a gap between the cover wall 50 and the welded part 29. Further, the cover wall 50 may remotely cover the welded part 29.

The cover wall 50 includes an upper wall 51 and a lateral wall 52. The upper wall 51 and the lateral wall 52 are united with each other. The cover wall 50 may include an upper wall 51 and a lateral wall 52 that are mutually separable or may omit one of the upper wall 51 and the lateral wall 52.

The upper wall 51 has a substantially rectangular frame shape fitting in the outer edge 23c of the outer cover 23, for example. The upper wall 51 covers part of the second surface 23b of the outer cover 23 and the welded part 29 located on the second surface 23b. The upper wall 51 tightly attaches to the part of the second surface 23b of the outer cover 23 and the welded part 29 on the second surface 23b. The upper wall 51 may have a plate shape that covers the entire second surface 23b of the outer cover 23.

The upper wall 51 includes an inner edge 51a and an outer edge 51b. The inner edge 51a is an inner-side edge of the frame-shaped upper wall 51. The outer edge 51b is an outer-side edge of the frame-shaped upper wall 51. If the upper wall 51 covers the entire second surface 23b, the inner edge 51a is omissible.

The lateral wall 52 projects from the outer edge 51b of the upper wall 51. The lateral wall 52 has a substantially rectangular frame shape fitting in the outer surface 26d of the peripheral wall 26 of the base 21, for example. The lateral wall 52 covers the entire outer edge 23c of the outer cover 23, part of the outer surface 26d of the peripheral wall 26, and the welded part 29 located on the outer edge 23c and the outer surface 26d. The lateral wall 52 tightly attaches to the entire outer edge 23c of the outer cover 23, the part of the outer surface 26d of the peripheral wall 26, and the welded part 29 located on the outer edge 23c and the outer surface 26d.

The welded part 29 is difficult to be smoothened as compared with the part of the housing 11 formed by casting, forging, or cutting, for example. Thus, the welded part 29 may have unevenness. However, the cover wall 50 made of a synthetic rubber is elastically deformable along the unevenness to be able to tightly attaches to the uneven welded part 29. The welded part 29 may be made smooth.

In this embodiment, the outer surface 26d of the peripheral wall 26 includes a first outer surface 61, a second outer surface 62, and a connection surface 63. The second outer surface 62 is an example of an inclined surface. The first outer surface 61 faces in a direction substantially orthogonal to the Z-axis, for example. The first outer surface 61 may face in another direction. The second outer surface 62 is closer to the inner chamber 27 than the first outer surface 61 is, and is closer to the end surface 26e than the first outer surface 61 is. The connection surface 63 connects the first outer surface 61 to the second outer surface 62, and faces substantially in the +Z-direction.

The second outer surface 62 is connected to the end surface 26e. Thus, the welded part 29 is located on part of the second outer surface 62 of the outer surface 26d. The second outer surface 62 is not limited to this example. The second outer surface 62 is inclined closer to the inner chamber 27 as being further away from the end surface 26e. That is, the second outer surface 62 and the connection surface 63 form a groove 65 that is recessed from the first outer surface 61 toward the inside of the housing 11. The second outer surface 62 may be substantially in parallel to the first outer surface 61.

The second outer surface 62, the connection surface 63, and the groove 65 are formed by, for example, cutting with a milling machine. The inclined second outer surface 62 is formed on the peripheral wall 26 by, for example, cutting part of the peripheral wall 26 with an end mill set in a diagonally tilted position. The manufacturing method of the second outer surface 62 is not limited to this example.

Cutting the peripheral wall 26 is a typical process in the manufacturing of the HDD 10. Thus, the second outer surface 62, the connection surface 63, and the groove 65 can be formed without an additional special manufacturing process.

The lateral wall 52 of the first protective member 41 covers and contacts part of the second outer surface 62. The lateral wall 52 tightly attaches to the part of the second outer surface 62. Consequently, part of the lateral wall 52 is contained in the groove 65.

The lateral wall 52 projects from the upper wall 51 along the second outer surface 62. The lateral wall 52 is inclined closer to the inner chamber 27 as being further away from the upper wall 51. In other words, the lateral wall 52 of the frame shape extends from the upper wall 51 in a tapered manner.

Of the housing 11, the part 11c including the welded part 29 is located between the upper wall 51 and the lateral wall 52 in the z-direction. Thus, the upper wall 51 abuts on the second surface 23b of the outer cover 23, thereby restricting the outer cover 23 from moving in the −z-direction with respect to the housing 11. Further, the lateral wall 52 abuts on the second outer surface 62 of the peripheral wall 26, thereby restricting the outer cover 23 from moving in the +z-direction with respect to the housing 11. In other words, the lateral wall 52 fits in and retains the second outer surface 62, thereby restricting the outer cover 23 from moving in the +z-direction with respect to the housing 11.

The first protective member 41 is attached to the housing 11 in the following manner by way of example. The method of attaching the first protective member 41 to the housing 11 is not limited to the following method. First, the frame-shaped lateral wall 52, which extends from the upper wall 51 in a tapered manner, is expanded. The lateral wall 52 made of a material with a low Young's modulus, such as a synthetic rubber, is easily elastically expandable.

The housing 11 is then contained inside the expanded lateral wall 52. The expansion of the lateral wall 52 is then released and the lateral wall 52 is restored to come into contact with the second outer surface 62 of the peripheral wall 26 of the housing 11. The shape of the lateral wall 52 is set to fit in the second outer surface 62 or to slightly smaller than the second outer surface 62. Thus, the lateral wall 52 exerts an elastic force to press the second outer surface 62.

As illustrated in FIG. 3, the housing 11 includes second outer surfaces 62a and 62b. The second outer surface 62a is part of the second outer surface 62 at the end of the housing 11 in the +Y-direction, for example. The second outer surface 62b is part of the second outer surface 62 at the end of the housing 11 in the −Y-direction. The second outer surface 62a is an example of a first lateral surface. The second outer surface 62b is an example of a second lateral surface, and is opposite to the second outer surface 62a.

The cover wall 50 includes lateral walls 52a and 52b. The lateral wall 52a is an example of a first lateral wall. The lateral wall 52b is an example of a second lateral wall. The lateral wall 52a covers and contacts part of the second outer surface 62a. The lateral wall 52b covers and contacts part of the second outer surface 62b.

As described above, the housing 11 is accommodated inside the expanded lateral wall 52. Thus, the distance between the lateral wall 52a and the lateral wall 52b is elastically elongated by the housing 11. The inner circumference of the lateral wall 52 is also elastically expanded by the housing 11.

The lateral wall 52a presses the second outer surface 62a. The lateral wall 52b presses the second outer surface 62b. That is, the lateral wall 52 exerts an elastic force to press the second outer surfaces 62a and 62b. In other words, the housing 11 is sandwiched between the lateral wall 52a and the lateral wall 52b. Consequently, the first protective member 41 presses the second outer surfaces 62a and 62b by an elastic force and is thereby held by the housing 11.

Similarly, the lateral wall 52 presses the part of the second outer surface 62 by an elastic force at both ends of the housing 11 in the X direction. In the manner described above, the first protective member 41 is detachably attached to the housing 11. After the first protective member 41 is removed from the housing 11, the distance between the lateral wall 52a and the lateral wall 52b is shortened.

The second protective members 42 are made of a metal, such as an aluminum alloy. The second protective members 42 made of a metal are higher in Young's modulus than the first protective member 41. The second protective members 42 are positioned outside the housing 11 to cover at least part of the welded part 29 and the first protective member 41 covering the welded part 29.

The housing 11 includes a second end 11b. The second end 11b is the end of the housing 11 in the −Y-direction and opposite to the first end 11a. One of the second protective members 42 covers the part of the welded part 29 located at the first end 11a of the housing 11. The other of the second protective members 42 covers the part of the welded part 29 located at the second end 11b of the housing 11.

The first protective member 41 covering the welded part 29 is located between the second protective members 42 and the welded part 29. Thus, the second protective members 42 cover at least part of the first protective member 41 and cover the welded part 29 from above the first protective member 41.

Each of the two second protective members 42 includes a first wall 71 and a second wall 72. The first wall 71 and the second wall 72 are united together. Each second protective member 42 may include a first wall 71 and a second wall 72 mutually separable or may omit one of the first wall 71 and the second wall 72.

As illustrated in FIG. 2, for example, the first wall 71 has a substantially rectangular plate shape extending substantially in the X-direction along the outer edge 23c of the outer cover 23 at the first end 11a or second end 11b. The first wall 71 covers part of the second surface 23b of the outer cover 23, the welded part 29 on the second surface 23b, and the first protective member 41 covering the second surface 23b and the welded part 29. The first wall 71 may contact the first protective member 41 or may be apart from the first protective member 41.

The first wall 71 is fixed to the second surface 23b with a bonding member 75, for example. The bonding member 75 is formed of an adhesive or a double-sided adhesive tape, for example. The adhesive and the double-sided adhesive tape are made of a synthetic resin, for example. The bonding member 75 may fix the first wall 71 to the first protective member 41.

The first wall 71 includes an edge 71a. The edge 71a is the edge of the first wall 71 in the Y-direction, and is located more outside the housing 11 than the outer edge 23c of the outer cover 23. For example, the edge 71a of the second protective member 42 attached to the first end 11a of the housing 11 is apart from the outer edge 23c in the +Y-direction. The edge 71a of the second protective member 42 attached to the second end 11b of the housing 11 is apart from the outer edge 23c in the −Y-direction.

The second wall 72 projects from the edge 71a of the first wall 71. The second wall 72 covers part of the outer edge 23c of the outer cover 23, part of the outer surface 26d of the peripheral wall 26, the welded part 29 located on the outer edge 23c and the outer surface 26d, and the first protective member 41 covering the outer surface 26d and the welded part 29.

The second wall 72 is apart from the welded part 29 and the first protective member 41 and contacts the outer surface 26d. In this embodiment, the second wall 72 extends diagonally closer to the housing 11 as being further away from the first wall 71, and abuts on the first outer surface 61. The second wall 72 may contact the welded part 29 or may be apart from the outer surface 26d.

The HDD 10 as described above is inserted into and removed from the rack of the host computer in the Y-direction, for example. The Y-direction can also be called "insertion/removal direction". The housing 11 may collide with another object such as the rack at the time of insertion or removal of the HDD 10 into or from the rack or a worker's handling the HDD 10 for transportation or other purposes, for example.

The first protective member 41 covers the welded part 29. The second protective members 42 cover the welded part 29 from above the first protective member 41. That is, another object cannot directly collide with the welded part 29 but may collide with the first protective member 41 or the second protective members 42.

When collision with another object occurs, the second protective members 42, separated from the first protective member 41 and the welded part 29, function to restrict a strong external force from the collision from being transmitted to the first protective member 41 and the welded part 29. Further, when colliding with another object, the first protective member 41 with a low Young's modulus is elastically deformed to absorb the impact from the collision and reduce the transmission of a strong external force to the welded part 29.

If the welded part 29 is damaged, the helium inside the inner chamber 27 may be released to the outside of the housing 11 and the outside air may enter the inner chamber 27 through cracks or holes in the welded part 29, for example. In such a case, a gas higher in density than helium, such as nitrogen, oxygen, and/or carbon dioxide, may cause an increase in the rotational resistance of the magnetic disks 12 and the magnetic heads 14, reducing the accuracy of positioning the magnetic heads 14. However, in the HDD 10 according to this embodiment, the first protective member 41 and the second protective members 42 protect the welded part 29, making it possible to avoid the airtightness of the inner chamber 27 from being impaired at the welded part 29.

In the HDD 10 according to the first embodiment described above, the first protective member 41 made of a resin covers at least part of the welded part 29. Consequently, if the HDD 10 collides with another object, for example, the first protective member 41 works to absorb the impact from the collision and reduce the transmission of the impact to the welded part 29. Further, the welded part 29 tends to vary in shape as compared with parts processed by, for example, casting and/or cutting, therefore, it is somewhat difficult to set the position of the welded part 29 with respect to, for example, the first protective member 41. However, the first protective member 41 made of a resin is generally softer than the welded part 29, so that the first protective member 41 can reduce the application of a strong external force to the welded part 29 when interfering with the welded part 29, for example. Consequently, the HDD 10 according to this embodiment can avoid the airtightness of the inner chamber 27 from being impaired at the welded part 29. For example, the HDD 10 according to this embodiment can prevent entry of the outside air into the inner chamber 27, which would otherwise increase the rotational resistance of the magnetic disks 12 and the magnetic heads 14, thereby avoiding deterioration in the positioning performance for the magnetic heads 14 with respect to the magnetic disks 12.

In other words, the first protective member 41, which is lower in Young's modulus than the welded part 29, covers at least part of the welded part 29. Thus, the first protective member 41 functions to absorb the impact from collision between the HDD 10 and another object, if it occurs, and reduces the transmission of the impact to the welded part 29. Further, because of the lower Young's modulus than the welded part 29, the first protective member 41 can reduce the application of a strong external force to the welded part 29 if interfering with the welded part 29, for example. Consequently, the HDD 10 according to this embodiment can avoid the airtightness of the inner chamber 27 from being impaired at the welded part 29.

The first protective member 41 tightly attaches to the welded part 29. This increases the frictional force between the first protective member 41 and the housing 11. Consequently, it is possible to restrict the first protective member 41 from being unintentionally detached from the housing.

The first protective member 41 covers the entire surface of the welded part 29. Thus, the first protective member 41 can prevent the welded part 29 from directly colliding with another member.

The housing 11 includes the second outer surface 62a and the second outer surface 62b opposite to the second outer surface 62a. The first protective member 41 includes the lateral wall 52a that abuts on the second outer surface 62a, and the lateral wall 52b that abuts on the second outer surface 62b. The first protective member 41 is detachably attached to the housing 11. The distance between the lateral wall 52a and the lateral wall 52b is elastically elongated by the housing 11. Thus, the first protective member 41 is easily attachable to the housing 11. Further, the first protective member 41 can be attached to the housing 11 without bonding and is thus easily removable from the housing 11.

The peripheral wall 26 includes the first inner surface 26a and the second inner surface 26b both facing the inner chamber 27, the outer surface 26d opposite to the first inner surface 26a and the second inner surface 26b and facing the outside of the housing 11, and the end surface 26e supporting the outer cover 23. In the welded part 29, the end surface 26e and the outer cover 23 are welded to each other. The outer surface 26d includes the second outer surface 62 inclined closer to the inner chamber 27 as being further away from the end surface 26e. The first protective member 41 covers at least part of the outer cover 23 and at least part of the outer surface 26d, and contacts the second outer surface 62. Specifically, in the Z-direction in which the end surface 26e faces, the part 11c of the housing 11 is located between the upper wall 51 of the first protective member 41 covering the outer cover 23, and the lateral wall 52 of the first protective member 41 in contact with the second outer surface 62. Consequently, the lateral wall 52 of the first protective member 41 in contact with the second outer surface 62 works to restrict the first protective member 41 from separating from the housing 11 in the Z-direction and being unintentionally detached from the housing 11.

The second protective members 42 made of a metal are located outside the housing 11. The second protective members 42 partially cover the welded part 29, i.e., the part located on at least one of the first end 11a and the opposing second end 11b of the housing 11. Further, the second protective members 42 cover at least part of the first protective member 41. Consequently, the second protective members 42 serve to reduce the transmission of the impact from collision between the HDD 10 and another object, for example, to the welded part 29 and the first protective member 41. Further, the second protective members 42 made of a metal cover the first protective member 41 to thereby prevent the deterioration of the first protective member 41 made of a resin.

Second Embodiment

Next, an explanation will be given of a second embodiment with reference to FIG. 4. It should be noted that, in the following description of a plurality of embodiments, the constituent elements having functions substantially the same as those of constituent elements previously described are denoted by reference symbols the same as those for the constituent elements previously described, and, further, their description will be omitted in some cases. Furthermore, a plurality of constituent elements denoted by the same reference symbols are not necessarily the same in all the functions and properties, but may be different in function and/or property as needed for the respective embodiments.

Figure 4:
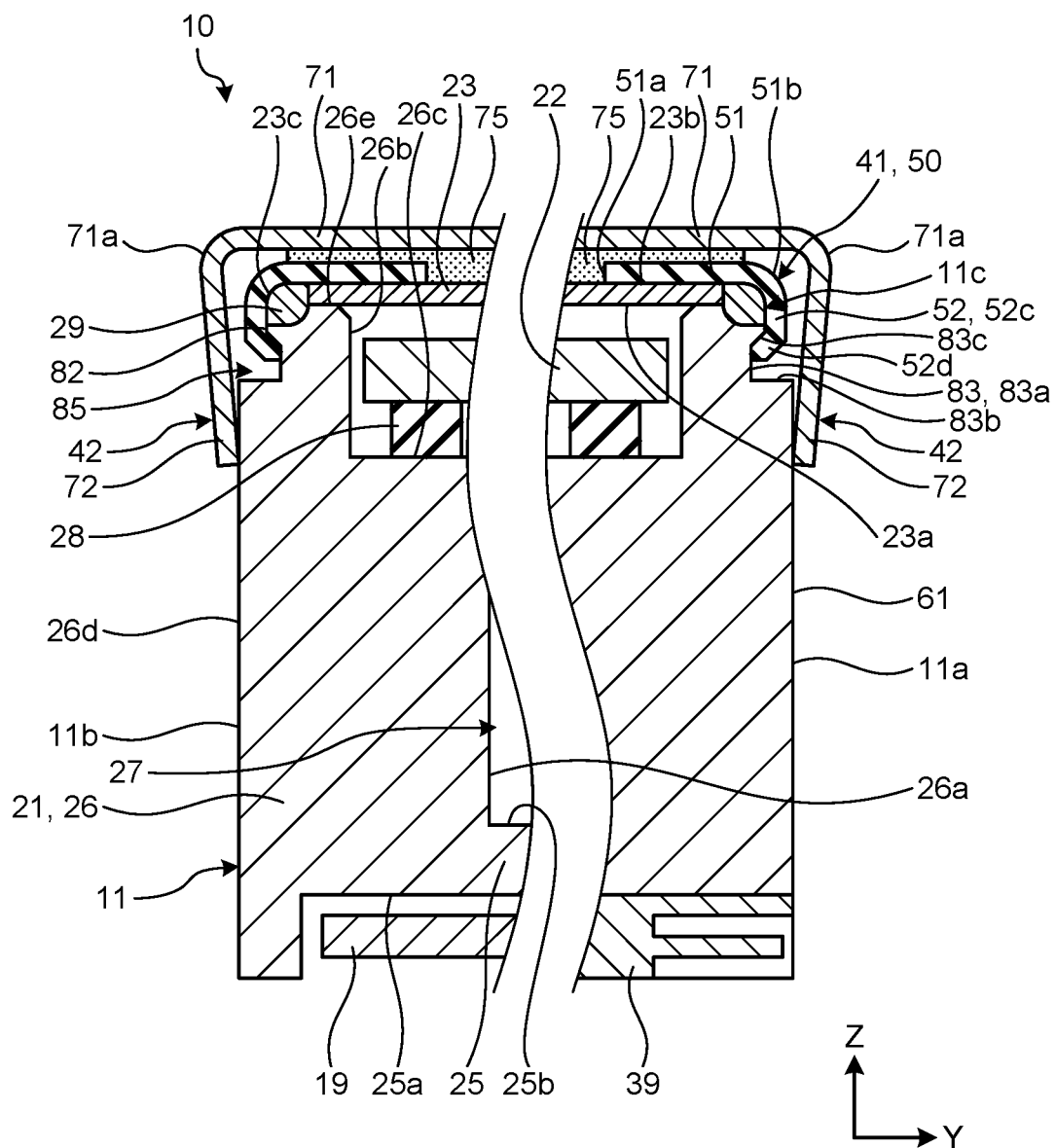
FIG. 4 is an exemplary sectional view illustrating part of an HDD according to a second embodiment.

FIG. 4 is an exemplary sectional view illustrating part of an HDD 10 according to the second embodiment. As illustrated in FIG. 4, the outer surface 26d of the second embodiment includes a second outer surface 82 and a recessed surface 83 instead of the second outer surface 62 and the connection surface 63. The first outer surface 61 and the second outer surface 82 represent an example of an outer surface. As in the first embodiment, the first outer surface 61 faces in a direction substantially orthogonal to the Z-axis, for example.

The second outer surface 82 is closer to the inner chamber 27 and to the end surface 26e than the first outer surface 61 is. The second outer surface 82 faces in a direction substantially orthogonal to the Z-axis, for example. In other words, the second outer surface 82 is substantially in parallel to the first outer surface 61. The second outer surface 82 is connected to the end surface 26e. Thus, the welded part 29 is located on part of the second outer surface 82 of the outer surface 26d. The second outer surface 82 is not limited to this example.

The recessed surface 83 is located between the first outer surface 61 and the second outer surface 82 and is away from the end surface 26e of the peripheral wall 26. The recessed surface 83 is recessed from the first outer surface 61 and the second outer surface 82 toward the inside of the housing 11. That is, the recessed surface 83 forms a groove 85 recessed from the first outer surface 61 and the second outer surface 82 toward the inside of the housing 11.

The recessed surface 83 includes a first portion 83a, a second portion 83b, and a third portion 83c, for example. The first portion 83a faces in a direction substantially orthogonal to the Z-axis, for example. In other words, the first portion 83a is substantially in parallel to the first outer surface 61 and the second outer surface 82. The second portion 83b connects the first portion 83a to the first outer surface 61, and faces substantially in the +Z-direction. The third portion 83c connects the first portion 83a to the second outer surface 82, and faces substantially in the −Z-direction. The third portion 83c is closer to the end surface 26e than the first portion 83a and the second portion 83b are. The recessed surface 83 is not limited to this example.

The second outer surface 82, the recessed surface 83, and the groove 85 are formed by, for example, cutting with a milling machine. For example, the second outer surface 82 and the recessed surface 83 are formed by cutting part of the peripheral wall 26 with an end mill having a widened tip and long in the Z-direction. The manufacturing method of the second outer surface 82 and the recessed surface 83 is not limited to this example.

The lateral wall 52 of the second embodiment includes a covering portion 52c and a fitting portion 52d. The covering portion 52c projects from the upper wall 51 substantially in the −Z-direction. The covering portion 52c has a substantially rectangular frame shape fitting in the second outer surface 82 of the peripheral wall 26 of the base 21, for example. The covering portion 52c covers the entire outer edge 23c of the outer cover 23, the entire second outer surface 82 of the peripheral wall 26, and the welded part 29 located on the outer edge 23c and the second outer surface 82. The covering portion 52c tightly attaches to the entire outer edge 23c of the outer cover 23, part of the second outer surface 82 of the peripheral wall 26, and the welded part 29 located on the outer edge 23c and the second outer surface 82.

The fitting portion 52d projects from the covering portion 52c toward the inside of the housing 11. The fitting portion 52d has a substantially rectangular frame shape fitting in the third portion 83c of the recessed surface 83, for example. The fitting portion 52d is contained in the groove 85, to cover the third portion 83c of the recessed surface 83. The fitting portion 52d tightly attaches to or contacts the third portion 83c of the recessed surface 83.

Of the housing 11, the part 11c including the welded part 29 is located between the upper wall 51 and the fitting portion 52d of the lateral wall 52 in the Z-direction. Thus, the fitting portion 52d abuts on the third portion 83c of the recessed surface 83, thereby restricting the outer cover 23 from moving in the +Z-direction with respect to the housing 11. In other words, the fitting portion 52d fits in and retains the third portion 83c, thereby restricting the outer cover 23 from moving in the +Z-direction with respect to the housing 11.

In the HDD 10 according to the second embodiment described above, the peripheral wall 26 includes the first inner surface 26a and the second inner surface 26b both facing the inner chamber 27, the first outer surface 61 and the second outer surface 82 opposite to the first inner surface 26a and the second inner surface 26b and facing the outside of the housing 11, the end surface 26e that supports the outer cover 23, and the recessed surface 83 that is apart from the end surface 26e and is recessed from the first outer surface 61 and the second outer surface 82 toward the inside of the housing 11. The first protective member 41 covers at least part of the outer cover 23 and the second outer surface 82, and contacts the recessed surface 83. Specifically, in the Z-direction in which the end surface 26e faces, the part 11c of the housing 11 is located between the upper wall 51 of the first protective member 41 covering the outer cover 23, and the fitting portion 52d of the first protective member 41 contacting the recessed surface 83. Consequently, the fitting portion 52d of the first protective member 41, which contacts the recessed surface 83, restricts the first protective member 41 from separating from the housing 11 in the Z-direction and being unintentionally detached from the housing 11.

Third Embodiment

Figure 5:
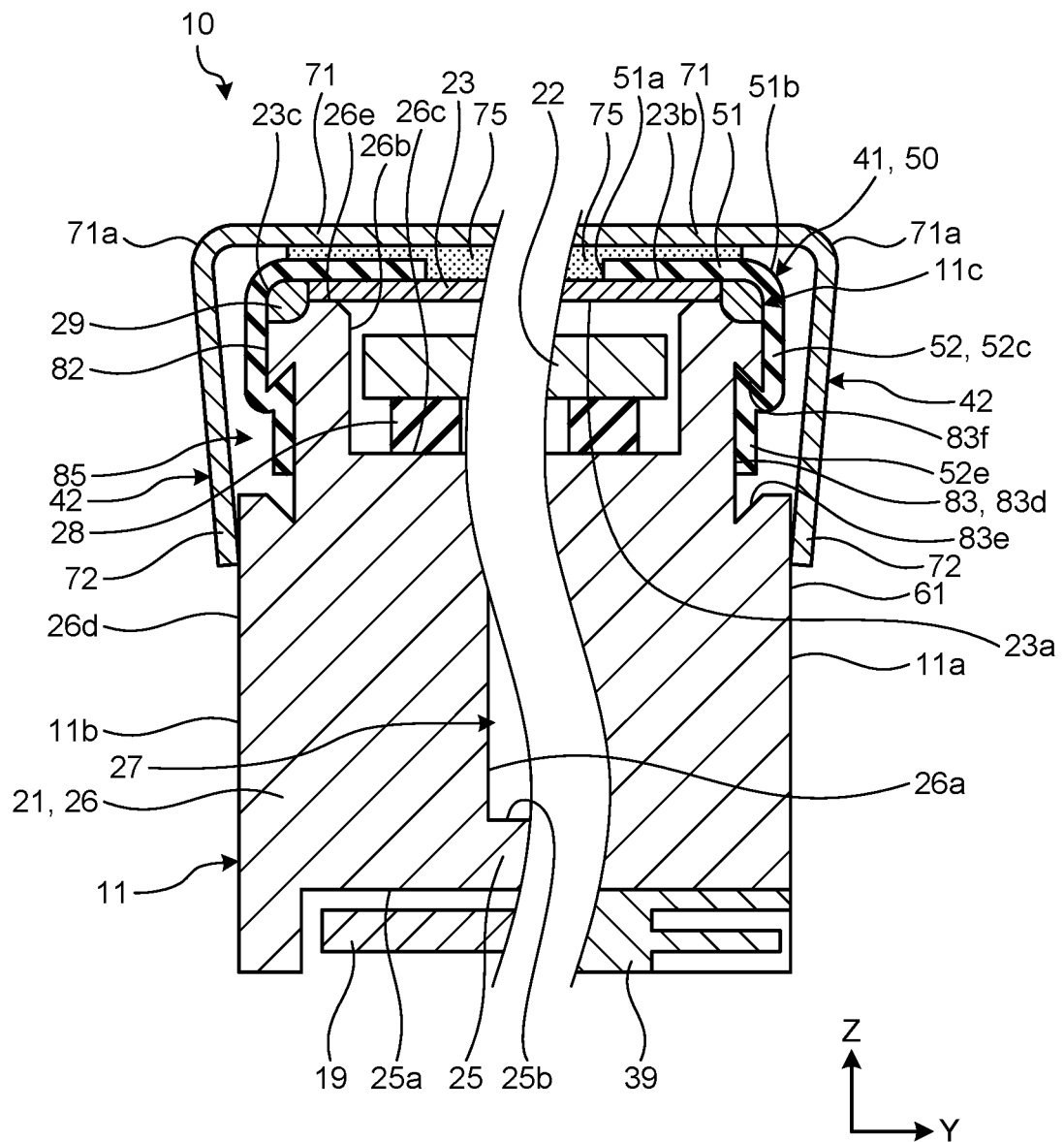
FIG. 5 is an exemplary sectional view illustrating part of an HDD according to a third embodiment.

Next, an explanation will be given of a third embodiment with reference to FIG. 5. FIG. 5 is an exemplary sectional view illustrating part of an HDD 10 according to the third embodiment. As illustrated in FIG. 5, the recessed surface 83 of the third embodiment includes, for example, a bottom 83d, a first inclined portion 83e, and a second inclined portion 83f, instead of the first portion 83a, the second portion 83b, and the third portion 83c. The second inclined portion 83f is an example of an inclined portion.

The bottom 83d faces in a direction substantially orthogonal to the Z-axis, for example. In other words, the bottom 83d is substantially in parallel to the first outer surface 61 and the second outer surface 82. The first inclined portion 83e connects the bottom 83d to the first outer surface 61. The first inclined portion 83e is inclined further away from the end surface 26e of the peripheral wall 26 as being closer to the inside of the housing 11 from the first outer surface 61.

The second inclined portion 83f connects the bottom 83d to the second outer surface 82. The second inclined portion 83f is closer to the end surface 26e than the bottom 83d and the first inclined portion 83e are. The second inclined portion 83f is inclined closer to the end surface 26e of the peripheral wall 26 as being closer to the inside of the housing 11 from the second outer surface 82.

The second outer surface 82, the recessed surface 83, and the groove 85 are formed by, for example, cutting with a milling machine. For example, the second outer surface 82 is formed by cutting part of the peripheral wall 26 with an end mill long in the Z-direction. The recessed surface 83 and the groove 85 are formed by cutting part of the peripheral wall 26 with an end mill having a widened tip and long in a direction orthogonal to the Z-axis. The manufacturing method of the second outer surface 82, the recessed surface 83, and the groove 85 is not limited to this example.

The lateral wall 52 of the third embodiment includes an fitting portion 52e instead of the fitting portion 52d. The fitting portion 52e projects from the covering portion 52c toward the inside of the housing 11. The fitting portion 52e has a substantially rectangular frame shape fitting in the bottom 83d and the second inclined portion 83f of the recessed surface 83, for example. The fitting portion 52e is contained in the groove 85 and covers part of the bottom 83d of the recessed surface 83 and the entire second inclined portion 83f. The fitting portion 52e tightly attaches to or contacts the bottom 83d and the second inclined portion 83f of the recessed surface 83.

Of the housing 11, the part 11c including the welded part 29 is located between the upper wall 51 and the fitting portion 52e of the lateral wall 52 in the Z-direction. Thus, the second inclined portion 83f is located between the upper wall 51 of the first protective member 41 covering at least part of the outer cover 23, and the fitting portion 52e of the first protective member 41 contacting the recessed surface 83.

The fitting portion 52e abuts on the second inclined portion 83f of the recessed surface 83, to thereby restrict the outer cover 23 from moving in the +Z-direction with respect to the housing 11. For example, along with motion of the outer cover 23 in the +Z-direction with respect to the housing 11, the fitting portion 52e moves toward the inside of the housing 11 along the second inclined portion 83f. That is, the fitting portion 52e moves not in a direction to come off from the groove 85 but in a direction to deeply enter into the groove 85. Consequently, the second inclined portion 83f works to restrain the fitting portion 52e from being detached from the groove 85.

In the HDD 10 according to the third embodiment described above, the recessed surface 83 includes the second inclined portion 83f. The second inclined portion 83f is closer to the end surface 26e of the peripheral wall 26 as being closer to the inside of the housing 11 from the second outer surface 82, and is located between the upper wall 51 of the first protective member 41 covering at least part of the outer cover 23, and the fitting portion 52e of the first protective member 41 contacting the recessed surface 83. The first protective member 41 contacts the second inclined portion 83f. For example, when the first protective member 41 moves in the Z-direction in which the end surface 26e faces, the fitting portion 52e of the first protective member 41, in contact with the second inclined portion 83f, is pulled toward the inside of the housing 11. Consequently, the fitting portion 52e of the first protective member 41 contacting the second inclined portion 83f works to restrict the first protective member 41 from separating from the housing 11 in the Z-direction and being unintentionally detached from the housing 11.

In the plurality of embodiments described above, the first protective member 41 is attached to the housing 11 by an elastic force by way of example. Alternatively, the first protective member 41 may be attached to the housing 11 in another manner as described below, for example.

Figure 6:
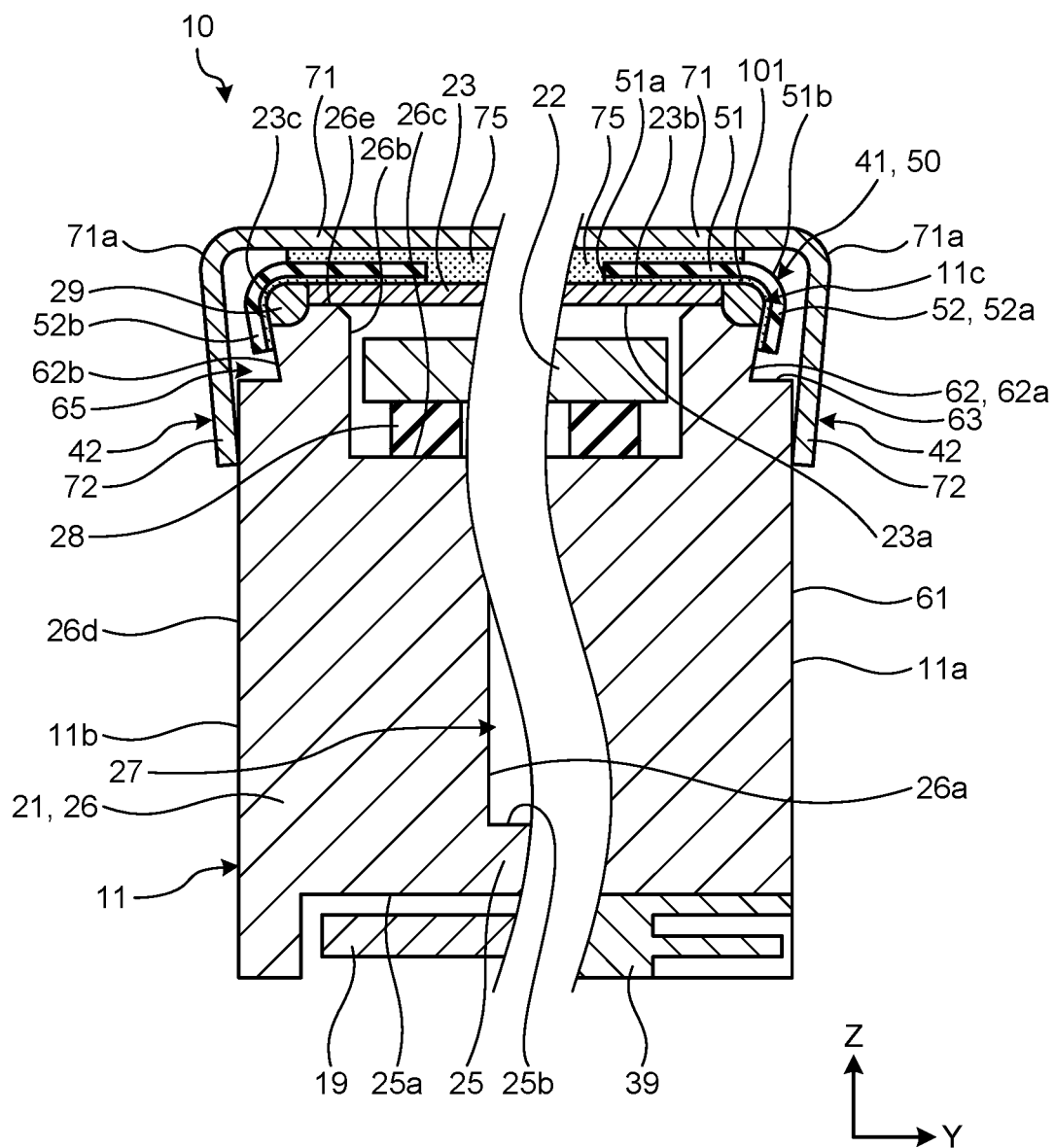
FIG. 6 is an exemplary sectional view illustrating part of an HDD according to a modification of the embodiments.

FIG. 6 is an exemplary sectional view illustrating part of an HDD 10 according to a modification of the embodiments.

FIG. 6 illustrates part of the HDD 10 of the first embodiment to which a first modification is applied, for example. However, the first modification may be applied to the second embodiment or third embodiment. In the first modification illustrated in FIG. 6, the first protective member 41 includes a cover wall 50 and a bonding member 101.

The bonding member 101 is formed of an adhesive or a double-sided adhesive tape, for example. The adhesive and the double-sided adhesive tape are made of a synthetic resin, for example. The bonding member 101 spreads between the cover wall 50 and the housing 11 and bonds the cover wall 50 to the housing 11. For example, the bonding member 101 covers and tightly attaches to the entire surface of the welded part 29.

In the HDD 10 according to the first modification described above, the first protective member 41 includes the cover wall 50 made of a resin that covers at least part of the welded part 29, and the bonding member 101 that bonds the cover wall 50 to the housing 11. Thereby, the first protective member 41 can be restricted from being unintentionally detached from the housing 11.

In a second modification, the cover wall 50 of the first protective member 41 clings to the housing 11. For example, the resin cover wall 50, while clinging to the metal housing 11, is molded by outsert molding. The resin cover wall 50 continuously clings to the metal housing 11 after the molding. Alternatively, the cover wall 50 made of a sticky synthetic resin, such as a tape or gel, may be manufactured separately from the housing 11 and then caused to cling to the housing 11. Alternatively, the cover wall 50 may be caused to cling to the housing 11 by air pressure or magnetic field. That is, the cover wall 50 can be attached to the housing 11 in various manners including fixing, adhering, bonding, and adsorbing.

In another example, the cover wall 50 clinging to the housing 11 is formed by applying and curing a thermosetting or photo-curable coating to the housing 11. In other words, the cover wall 50 may be made of a thermosetting resin or a photo-curable resin. For example, the photo-curable resin is cured by irradiation with visible light, infrared rays, ultraviolet rays, or X-rays.

In the HDD 10 according to the second modification described above, the first protective member 41 clings to the housing 11. Thereby, the first protective member 41 can be restricted from being unintentionally detached from the housing 11. Further, by applying the first protective member 41 made of a thermosetting resin or a photo-curable resin to the welded part 29 and curing them with heat or light, for example, the first protective member 41 can be tightly attached to the welded part 29.

In a third modification, the cover wall 50 of the first protective member 41 is made of a material that shrinks by heating, such as a heat-shrinkable film. For example, the cover wall 50, while covering the welded part 29, is caused to shrink and tightly attach to the welded part 29 by heating. In this case, the cover wall 50 becomes shrunken at a temperature lower than the melting point of the welded part 29.

In the HDD 10 according to the third modification described above, the first protective member 41 shrinks when heated. For example, the first protective member 41, contacting the welded part 29, is caused to shrink by heating. Thereby, the first protective member 41 can be tightly attached to the welded part 29 easily.

According to at least one of the embodiments descried above, the first protective member is made of a resin and covers at least part of the welded part. Consequently, the first protective member functions to absorb the impact from collision between the disk device and another object, if it occurs, for example and reduces the transmission of the impact to the welded part. Further, the welded part tends to vary in shape as compared with the parts processed by, for example, casting and/or cutting, therefore, it is somewhat difficult to set the position of the welded part with respect to, for example, the first protective member. However, the first protective member made of a resin is generally softer than the welded part, so that the first protective member can be avoided from applying a strong external force to the welded part at the time of interfering with the welded part, for example. Consequently, the disk device of at least one of the embodiments can avoid the airtightness of the inner chamber from being impaired at the welded part. For example, the disk device of at least one embodiment can prevent entry of outside air into the inner chamber, which would otherwise increase the rotational resistance of the recording medium and the magnetic head, thereby avoiding deterioration in the positioning performance for the magnetic head with respect to the recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A disk device comprising:
a recording medium of a disk form including a recording layer;
a magnetic head configured to read and write information from and to the recording medium;
a housing including:
a base provided with an inner chamber in which the recording medium and the magnetic head are accommodated,
a cover that covers the inner chamber, and
a welded part at which the base and the cover are welded to each other; and
a first protective member made of a resin and located outside the housing, to cover at least part of the welded part, wherein
the base includes a bottom wall, and a peripheral wall that projects from the bottom wall and surrounds the inner chamber,
the peripheral wall includes:
an inner surface that faces the inner chamber,
an outer surface opposite to the inner surface and facing outside of the housing,
an end surface that supports the cover, and
a recessed surface that is apart from the end surface and recessed from the outer surface toward inside of the housing,
the end surface and the cover are welded to each other at the welded part, and
the first protective member covers at least part of the cover and at least part of the outer surface, and contacts the recessed surface.
2. The disk device according claim 1, wherein the first protective member tightly attaches to the welded part.

3. The disk device according claim 1, wherein the first protective member covers the welded part entirely.

4. The disk device according claim 1, wherein the first protective member clings to the housing.

5. The disk device according claim 1, further comprising:
a connector disposed at a first end of the housing and connectable to an external apparatus; and
a second protective member made of a metal, and located outside the housing to cover:
part of the welded part, the part located on at least one of the first end and a second end of the housing, the second end opposite to the first end, and
at least part of the first protective member.

6. A disk device comprising:
a recording medium of a disk form including a recording layer;
a magnetic head configured to read and write information from and to the recording medium;
a housing including:
a base provided with an inner chamber in which the recording medium and the magnetic head are accommodated,
a cover that covers the inner chamber, and
a welded part at which the base and the cover are welded to each other; and
a first protective member that is lower in Young's modulus than the welded part and located outside the housing, to cover at least part of the welded part, wherein
the base includes a bottom wall, and a peripheral wall that projects from the bottom wall and surrounds the inner chamber,
the peripheral wall includes:
an inner surface that faces the inner chamber,
an outer surface opposite to the inner surface and facing outside of the housing,
an end surface that supports the cover, and
a recessed surface that is apart from the end surface and recessed from the outer surface toward inside of the housing,
the end surface and the cover are welded to each other at the welded part, and
the first protective member covers at least part of the cover and at least part of the outer surface, and contacts the recessed surface.

7. A disk device comprising:
a magnetic disk including a recording layer;
a magnetic head configured to read and write data from and to the magnetic disk;
a housing including:
a base in which the magnetic disk and the magnetic head are accommodated,
a cover welded to the base, and
a welded part at which the base and the cover are welded to each other; and
a protective member located outside the housing, to contact and cover at least part of the welded part, wherein
the base includes a bottom wall, and a peripheral wall that projects from the bottom wall and surrounds the magnetic disk and the magnetic head,
the peripheral wall includes:
an inner surface that faces the magnetic disk and the magnetic head,
an outer surface opposite to the inner surface and facing outside of the housing,
an end surface that supports the cover, and
a recessed surface that is apart from the end surface and recessed from the outer surface toward inside of the housing,
the end surface and the cover are welded to each other at the welded part, and
the protective member covers at least part of the cover and at least part of the outer surface, and contacts the recessed surface.

* * * * *